United States Patent [19]

Payne

[11] Patent Number: 4,611,619
[45] Date of Patent: Sep. 16, 1986

[54] AIR CONSERVING RESTRICTION FOR USE IN PNEUMATIC SYSTEMS

[75] Inventor: Peter P. Payne, Wheeling, Ill.

[73] Assignee: Honeywell Inc., Minneapolis, Minn.

[21] Appl. No.: 755,878

[22] Filed: Jul. 17, 1985

Related U.S. Application Data

[63] Continuation-in-part of Ser. No. 620,366, Jun. 13, 1984, abandoned.

[51] Int. Cl.⁴ .......................................... G05D 16/00
[52] U.S. Cl. .................................... 137/82; 137/84
[58] Field of Search ........................ 137/82, 85, 84, 86

[56] References Cited

U.S. PATENT DOCUMENTS

| | | |
|---|---|---|
| 2,409,294 | 10/1946 | Martin . |
| 2,718,878 | 9/1955 | Du Bois .................. 137/82 X |
| 2,836,153 | 5/1958 | Dyson ..................... 137/82 X |
| 2,897,670 | 8/1959 | Bentley ................... 137/82 X |
| 3,111,131 | 3/1967 | Zahuranec . |
| 3,894,562 | 7/1975 | Moseley . |
| 3,999,714 | 12/1976 | Lang . |

*Primary Examiner*—Alan Cohan
*Attorney, Agent, or Firm*—Trevor B. Joike

[57] ABSTRACT

A pneumatic condition sensing system for reducing the consumption of air supplied by a pneumatic source, the system having a bleed type pneumatic device for bleeding air from a branch line to atmosphere to control the pressure within the branch line in response to a sensed condition, an elongated restriction for connecting the bleed type device to the pneumatic source, the elongated restriction having an air conserving flow versus pressure relationship, and a controller connected to the branch line and responsive to the pressure therein for providing a control function usable in controlling a condition.

25 Claims, 6 Drawing Figures

AIR CONSERVING RESTRICTION FOR USE IN PNEUMATIC SYSTEMS

This application is a continuation-in-part of application Ser. No. 620,366 filed on June 13, 1984, now abandoned.

BACKGROUND OF THE INVENTION

The present invention relates to a restriction for conserving air in pneumatic systems and, more particularly, to an elongated restriction having an air conserving flow versus pressure characteristic resulting in reduced air consumption in pneumatic systems.

Pneumatic control systems as opposed to electric control systems are used to control the air conditioning of many buildings today because pneumatic control systems have historically been less expensive to install while at the same time providing adequate air conditioning control. Pneumatic control systems must necessarily require a source of compressed, clean and dry air. This source normally takes the form of a compressor for supplying air to the various sensors and control apparatus located throughout the building.

The sensors and many of these other control apparatus in the building normally take the form of bleed type devices which allow air to leak through the sensor to atmosphere, the amount of air leaking to atmosphere being regulated by the distance between a flapper and a nozzle. The amount of air leaking through the nozzle then governs the pressure in the line leading from the nozzle and it is this varying pressure as the bleed type sensor responds to varying conditions which provides the control pressure for the control system which regulates the controlled conditions.

If very many of these bleed type sensors are used throughout the building, air consumption can become quite large. Therefore, a large compressor is needed in order to supply the necessary amount of air required by the sensors.

Prior art pneumatic control systems have relied extensively upon flat plate restrictions to provide the necessary pressure drops in the control system. These restrictions resulted in convex flow versus pressure characteristics. Such restrictions allowed substantial amounts of air consumption. By reconfiguring the restriction, air consumption in pneumatic control systems can be materially reduced.

SUMMARY OF THE INVENTION

Accordingly, an arrangement is provided for substantially reducing the consumption of air in a pneumatic system, the arrangement having a bleed type pneumatic device for bleeding air from a branch line to atmosphere to control the pressure within the branch line, an elongated restriction for connecting the bleed type condition sensor to a pneumatic source, the elongated restriction having an air conserving flow versus pressure relationship, and a controller connected to the branch line and responsive to the pressure therein for providing a control function usable in controlling a condition.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
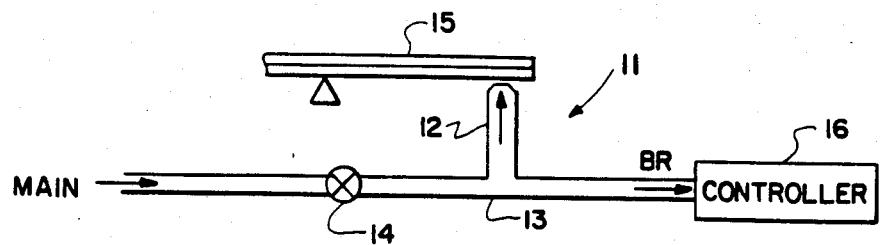
FIG. 1 shows a pneumatic control system having a single bleed type sensor.

FIG. 1 shows one of the pneumatic bleed type loads situated within a building. The particular load shown comprises sensor 11 and controller 16 with sensor 11 having nozzle 12 connected to branch line 13. Branch line 13 is connected through restriction 14 to a source of main pressure within the building in which bleed type load 11 is located and to controller 16. The source of main pressure can be a compressor which supplies pneumatic pressure throughout the building.

Nozzle 12 functions in cooperative relationship with condition responsive flapper 15. The distance between nozzle 12 and flapper 15 will vary in response to the condition being sensed by flapper 15 for changing the amount of air flowing out through nozzle 12 to atmosphere thus regulating the pressure within line 13. As the distance between flapper 15 and nozzle 12 increases the air flowing out of nozzle 12 increases and the pressure within line 13 decreases. Conversely, as the distance between flapper 15 and nozzle 12 decreases, the flow out of nozzle 12 decreases and the pressure within line 13 increases. Controller 16 then responds to the branch line pressure in branch line 13 for controlling the condition sensed by condition responsive flapper 15.

Figure 2:
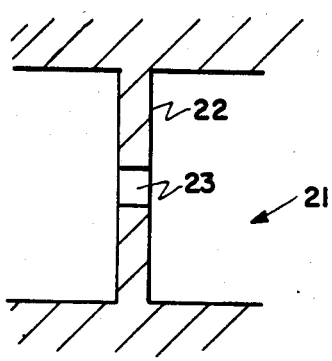
FIG. 2 shows a typical flat plate restriction.

FIG. 2 shows a flat plate restriction 21 which can be used for restriction 14 in FIG. 1. Restriction 21 comprises plate 22 with an aperture 23 located therein for permitting flow through plate 22.

Figure 3:
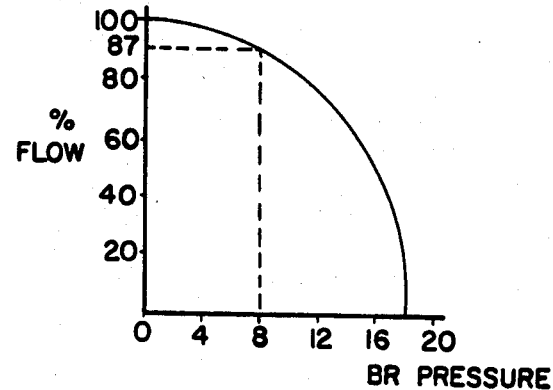
FIG. 3 shows the flow versus pressure curve for the flat plate restriction.

FIG. 3 shows the convex flow-pressure characteristic for the restriction shown in FIG. 2. Since most pneumatic control systems for controlling conditions within buildings operate around a midpoint of 8 psi, a branch line pressure of 8 psi as shown in FIG. 3 requires a flow through flat plate restriction 21 of about 87%. By contrast, full pressure of approximately 18 psi requires no flow through restriction 21 and 0 branch line pressure requires full or 100% flow through restriction 21 and out nozzle 12.

As can be seen, the compressor necessary to supply this average flow through restriction 21 and nozzle 12 can become quite large depending upon the number of bleed type pressure loads that may exist within the building and supplied by the compressor.

Figure 4:
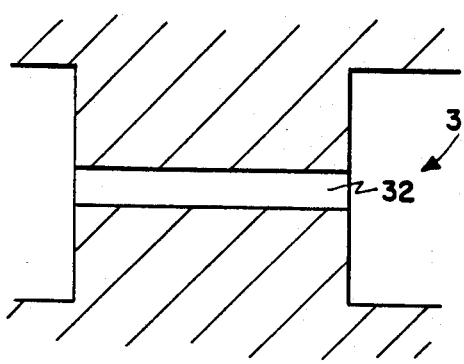
FIG. 4 shows a restriction according to the present invention.
Figure 5:
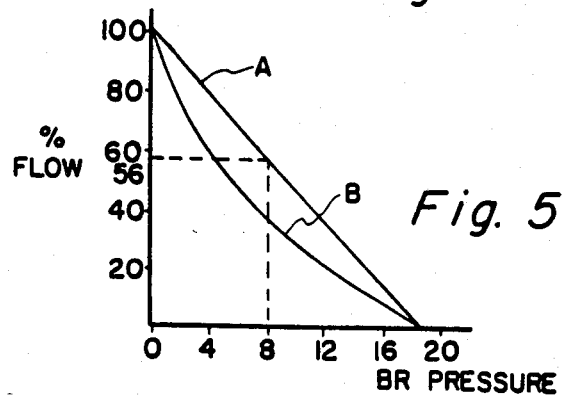
FIG. 5 shows the flow versus pressure curve for the restriction of FIG. 4.

FIG. 4 shows a restriction which can substantially reduce the flow and, therefore, save on compressor capacity. As shown in FIG. 4, restriction 31 includes an elongated aperture 32 having a length and diameter which can be designed to provide either a linear relationship A or a concave relationship B between the amount of flow therethrough and the pressure within the branch line. These relationships are shown in FIG. 5 and, with respect to curve A, as can be seen in contrast to FIG. 3, a branch line pressure of 8 psi results in about 56% flow through restriction 31 instead of the 87% flow through restriction 21. The result of the use of restriction 31 in the pneumatic control system within a building is to materially reduce the capacity and, therefore, the size required of the compressure which supplies the air to the pneumatic control system. If restriction 31 is configured to provide the concave response B, even further savings can be realized. However, the more concave the curve, the slower the response speed so that there will be a practical limit on just how concave the curve can be made.

Figure 6:
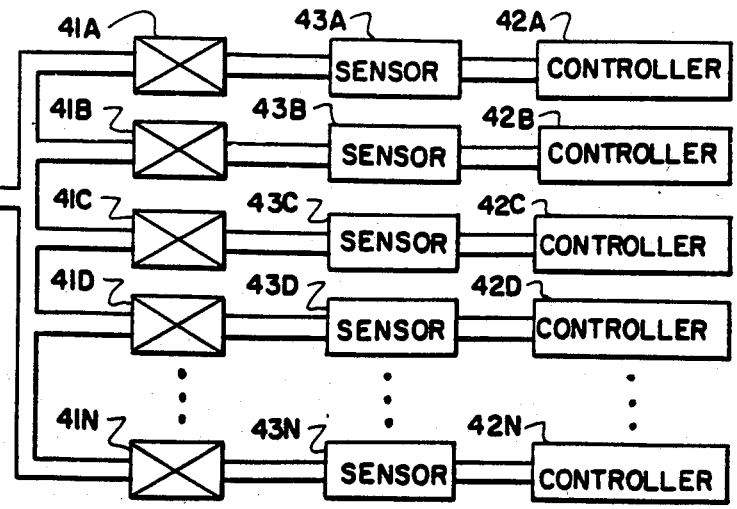
FIG. 6 shows a building's pneumatic control system.

Thus, FIG. 6 represents a control system as it may exist within a building which comprises a plurality of bleed type loads having sensors 43A–43N for supplying branch line pressure to condition controllers or actuators 42A–42N. Each sensor 43A–43N is connected through a respective elongated restriction 41A–41N to source 44 of pneumatic pressure. Because the typical pneumatic control system within a building such as that shown in FIG. 6 is comprised of a plurality of bleed type loads, a substantial amount of air volume can be saved by using the restrictions of FIG. 4 as opposed to those restrictions of FIG. 2. Therefore, smaller compressors requiring less energy input can be used for supplying the pneumatic air to such control systems. Moreover, the more linear restriction shown in FIG. 4 can have a larger opening or aperture than flat plate restrictions making the air conserving restrictions less prone to clogging from contamination.

For a restriction such as that shown in FIG. 4 which may have a circular cross section, a length-to-diameter ratio of 80 to 1 will essentially provide a linear response. A greater ratio will provide a concave response. For restrictions such as that shown in FIG. 4 that have a rectangular cross section, similar ratios for either linear or concave responses can be developed easily.

The embodiments of the invention in which an exclusive property or right is claimed are defined as follows:

1. A pneumatic condition sensing system for reducing the consumption of air supplied by a pneumatic source comprising:
   a bleed type condition sensor for bleeding air from a branch line to atmosphere to control the pressure within the branch line in response to a sensed condition;
   an elongated restriction for connecting said bleed type condition sensor to said pneumatic source, said elongated restriction having an air conserving flow versus pressure relationship, said relationship being anywhere within a range from concave to linear; and,
   a controlled connected to said branch line and responsive to the pressure therein for providing a control function usable in controlling the condition.

2. The system of claim 1 wherein said elongated restriction is configured to have a substantially linear flow versus pressure relationship.

3. The system of claim 2 wherein said bleed type condition sensor comprises a nozzle connected to said branch line and a condition responsive flapper operating in conjunction with said nozzle for controlling the pressure within said branch line, said nozzle and said flapper frequently permitting at least a portion of the pressure within said branch line to be bled out to atmosphere.

4. The system of claim 1 wherein said elongated restriction is configured to have a substantially convex flow versus pressure relationship.

5. The system of claim 4 wherein said bleed type condition sensor comprises a nozzle connected to said branch line and a condition responsive flapper operating in conjunction with said nozzle for controlling the pressure within said branch line, said nozzle and said flapper frequently permitting at least a portion of the pressure within said branch line to be bled out to atmosphere.

6. The system of claim 1 wherein said elongated restriction has a length and a diameter, said length-to-diameter ratio being substantially 80 to 1 for providing a substantially linear flow versus pressure relationship.

7. The system of claim 1 wherein said elongated restriction has a length and a diameter, said length-to-diameter ratio being in excess of 80 to 1 to provide a concave flow versus pressure relationship.

8. An arrangement for substantially reducing the consumption of air in a pneumatic system, said air for said pneumatic system being supplied by a pneumatic source, said arrangement comprising:
   a plurality of bleed type loads wherein air supplied to said loads is bled out of the pneumatic system; and,
   elongated restriction means for connecting said plurality of bleed type loads to said pneumatic source for supplying air to said bleed type loads, said elongated restriction means having a non-convex flow versus pressure characterstic for reducing air consumption in said pneumatic system.

9. The arrangement of claim 8 wherein said elongated restriction is configured to have a substantially linear flow versus pressure relationship.

10. The arrangment of claim 9 wherein said plurality of bleed type loads comprise a plurality of bleed type condition sensors, each sensor having an input connected to said elongated restriction means and an output line for supplying branch line pressure as a function of a condition sensed, each of said bleed type condition sensors for bleeding air from said elongated restriction means to atmosphere to control the pressure within a corresponding branch line.

11. The system of claim 10 wherein each of said bleed type condition sensors comprises a nozzle connected to said corresponding branch line and a condition responsive flapper operating in conjunction with said nozzle for controlling the pressure within said corresponding branch line, said nozzle and said flapper frequently permitting at least a portion of the pressure within said corresponding branch line to be bled out to atmosphere.

12. The arrangement of claim 8 wherein said elongated restriction is configured to have a subsantially convex flow versus pressure relationship.

13. The arrangement of claim 12 wherein said plurality of bleed type loads comprise a plurality of bleed type condition sensors, each sensor having an input connected to said elongated restriction means and an output line for supplying branch line pressure as a function of a condition sensed, each of said bleed type condition sensors for bleeding air from said elongated restriction means to atmosphere to control the pressure within a corresponding branch line.

14. The arrangement of claim 13 wherein each of said bleed type condition sensors comprises a nozzle connected to said corresponding branch line and a condition responsive flapper operating in conjunction with said nozzle for controlling the pressure within said corresponding branch line, said nozzle and said flapper frequently permitting at least a portion of the pressure within said corresponding branch line to be bled out to atmosphere.

15. The system of claim 8 wherein said elongated restriction has a length and a diameter, said length-todiameter ratio being substantially 80 to 1 for providing a substantially linear flow versus pressure relationship.

16. The system of claim 8 wherein said elongated restriction has a length and a diameter, said length-to-diameter ratio being in excess of 80 to 1 to provide a concave flow versus pressure relationship.

17. An arrangement for substantially reducing the consumption of air in a pneumatic system, said air for said pneumatic system being supplied by a pneumatic source, said arrangement comprising:
a plurality of bleed type loads wherein air supplied to said loads is bled out of the pneumatic system; and,
a plurality of elongated restrictions each for connecting a respective one of said bleed type loads to said pneumatic source for supplying air to said bleed type loads, said plurality of elongated restrictions each having a non-convex flow versus pressure characteristic for reducing air consumption in said pneumatic system.

18. The arrangement of claim 17 wherein said elongated restriction is configured to have a substantially linear flow versus pressure relationship.

19. The arrangement of claim 18 wherein said plurality of bleed type loads comprise a plurality of bleed type condition sensors, each sensor having an input connected to a corresponding elongated restriction and an output line for supplying branch line pressure as a function of a condition sensed, each of said bleed type condition sensors for bleeding air from said corresponding elongated restriction to atmosphere to control the pressure within a corresponding branch line.

20. The arrangement of claim 19 wherein each of said bleed type condition sensors comprises a nozzle connected to said corresponding branch line and a condition responsive flapper operating in conjunction with said nozzle for controlling the pressure within said corresponding branch line, said nozzle and said flapper frequently permitting at least a portion of the pressure within said corresponding branch line to be bled out to atmosphere.

21. The arrangement of claim 17 wherein said elongated restriction is configured to have a substantially convex flow versus pressure relationship.

22. The arrangement of claim 21 wherein said plurality of bleed type loads comprise a plurality of bleed type condition sensors, each sensor having an input connected to a corresponding elongated restriction and an output line for supplying branch line pressure as a function of a condition sensed, each of said bleed type condition sensors for bleeding air from said corresponding elongated restriction to atmosphere to control the pressure within a corresponding branch line.

23. The arrangement of claim 22 wherein each of said bleed type condition sensors comprises a nozzle connected to said corresponding branch line and a condition responsive flapper operating in conjunction with said nozzle for controlling the pressure within said corresponding branch line, said nozzle and said flapper frequently permitting at least a portion of the pressure within said corresponding branch line to be bled out to atmosphere.

24. The system of claim 17 wherein said elongated restriction has a length and a diameter, said length-to-diameter ratio being substantially 80 to 1 for providing a substantially linear flow versus pressure relationship.

25. The system of claim 17 wherein said elongated restriction has a length and a diameter, said length-to-diameter ratio being in excess of 80 to 1 to provide a concave flow versus pressure relationship.

* * * * *

UNITED STATES PATENT OFFICE
CERTIFICATE OF CORRECTION

PATENT NO. : 4,611,619

DATED : September 16, 1986

INVENTOR(S) : Peter P. Payne

It is certified that error appears in the above-identified patent and that said Letters Patent are hereby corrected as shown below:

In Column 3, line 48, delete "controlled" and substitute --controller--.

Signed and Sealed this

Sixteenth Day of December, 1986

Attest:

DONALD J. QUIGG

*Attesting Officer*  *Commissioner of Patents and Trademarks*